(12) United States Patent
Kalavitz

(10) Patent No.: US 8,925,160 B2
(45) Date of Patent: Jan. 6, 2015

(54) ANCHOR POINT APPARATUS

(76) Inventor: Michael V. Kalavitz, Plainwell, MI (US)

(*) Notice: Subject to any disclaimer, the term of this patent is extended or adjusted under 35 U.S.C. 154(b) by 238 days.

(21) Appl. No.: 13/440,874

(22) Filed: Apr. 5, 2012

(65) Prior Publication Data

US 2012/0255149 A1  Oct. 11, 2012

Related U.S. Application Data

(60) Provisional application No. 61/472,534, filed on Apr. 6, 2011.

(51) Int. Cl.
| | |
|---|---|
| *F16B 2/08* | (2006.01) |
| *B23P 11/00* | (2006.01) |
| *G09F 17/00* | (2006.01) |
| *B60R 9/00* | (2006.01) |
| *G09F 21/04* | (2006.01) |
| *F16B 7/14* | (2006.01) |

(52) U.S. Cl.
CPC . *G09F 17/00* (2013.01); *B60R 9/00* (2013.01); *G09F 21/04* (2013.01); *F16B 2/08* (2013.01); *F16B 7/1418* (2013.01)
USPC ............ 24/343; 24/265 AL; 24/457; 248/503

(58) Field of Classification Search
CPC .......... B60R 9/00; F16B 2/08; F16B 7/1418; G09F 17/00; G09F 21/04
USPC ....... 24/2.5, 265 AL, 343, 457; 248/499, 500, 248/503, 505, 510
See application file for complete search history.

(56) References Cited

U.S. PATENT DOCUMENTS

| 2,382,945 | A  | * | 8/1945  | Trafton .......................... 24/16 R |
| 2,943,876 | A  | * | 7/1960  | Morris ........................... 403/313 |
| 7,322,146 | B1 | * | 1/2008  | Baldwin et al. ..................... 43/12 |
| 7,708,511 | B2 | * | 5/2010  | Terrill et al. ................... 411/400 |
| 8,099,887 | B2 | * | 1/2012  | McCoy et al. .................... 40/617 |
| 2009/0320740 | A1 | * | 12/2009 | Hume et al. ................... 116/173 |
| 2010/0319229 | A1 | * | 12/2010 | McCoy et al. ............. 40/606.01 |
| 2012/0111259 | A1 | * | 5/2012  | Swisher et al. ................ 116/173 |

* cited by examiner

*Primary Examiner* — Robert J Sandy
*Assistant Examiner* — Louis Mercado
(74) *Attorney, Agent, or Firm* — Joseph Stecewycz

(57) ABSTRACT

An anchor point apparatus is disclosed having a substantially cylindrical cavity extending along a longitudinal axis of a slotted tube; a tabbed bearing plate including a first attachment tab and a second attachment tab, the attachment tabs extending at predetermined angles from the tabbed bearing plate, the tabbed bearing plate generally conforming to a portion of an outer surface of the slotted tube; at least one circumferential clamp disposed about the slotted tube; and an attachment link having a first attachment ear secured within a first opening in the first attachment tab and a second attachment ear secured within a second opening in the second attachment tab.

11 Claims, 4 Drawing Sheets

US 8,925,160 B2

ANCHOR POINT APPARATUS

CROSS REFERENCE TO RELATED APPLICATION

The present application is related to Provisional Patent Application entitled "Anchor Point Apparatus," filed 6 Apr. 2011 and assigned filing No. 61/472,534, and is incorporated herein by reference in its entirety.

FIELD OF THE INVENTION

The present invention relates generally to anchor devices and, more specifically, to an anchor point apparatus suitable for use in stowing a mast-like pole.

BACKGROUND OF THE INVENTION

It is known in the art to utilize a safety flag assembly on a vehicle, where the safety flag assembly comprises an antenna or mast or flexible rod, and a safety flag. The safety flag assembly is typically deployed in an erect, or substantially vertical, position while in use. It has been observed that when such a safety flag assembly is not in use, a user may typically bend over the antenna or mast or rod, and tie down the safety flag assembly to the vehicle chassis in a hasty manner for storage. This is often accomplished by attaching a rope/or twine to any random location along the safety flag assembly, and attaching the rope or twine to a convenient location on the vehicle chassis. Alternatively, the safety flag assembly may be placed behind an object that is mounted to the vehicle chassis, the placement being made for storage where the safety flag assembly is not physically secured to the object. As such methods of securing are, in many cases, not really secure, such stowing methods may lead to safety issues.

What is needed is an attachment device which overcomes problems of the current state of the art.

BRIEF SUMMARY OF THE INVENTION

In one aspect of the present invention, an anchor point apparatus suitable for removably clamping to a mast comprises: a slotted tube having a substantially cylindrical cavity extending along a longitudinal axis of the slotted tube; a tabbed bearing plate including a first attachment tab and a second attachment tab, the attachment tabs extending at predetermined angles from the tabbed bearing plate, the tabbed bearing plate generally conforming to a portion of an outer surface of the slotted tube; at least one circumferential clamp disposed about the slotted tube; and an attachment link having a first attachment ear secured within a first opening in the first attachment tab and a second attachment ear secured within a second opening in the second attachment tab.

In another aspect of the present invention, an anchor point apparatus comprises: a slotted sleeve including a slotted tube, the slotted tube having a substantially cylindrical cavity extending along a longitudinal axis of the slotted tube, the slotted sleeve further including a first flange at a first end of the slotted tube and a second flange at a second end of the slotted tube; a tabbed bearing plate including a first attachment tab and a second attachment tab, the first attachment tab and the second attachment tab extending at substantially right angles from the tabbed bearing plate, the tabbed bearing plate having a curved surface generally conforming to an outer surface of the slotted tube; a convex bearing plate disposed against the slotted tube; a first circumferential clamp disposed about the slotted tube proximate the first flange and a second circumferential clamp disposed about the slotted tube proximate the second flange; and an attachment link having a substantially semi-circularly shaped bearing member.

In yet another aspect of the present invention, a method for securing the upper portion of a mast to an engagement feature on a support surface comprises: placing a slotted sleeve over the mast; positioning a tabbed bearing plate against the slotted sleeve; positioning first and second circumferential clamps over the tabbed bearing plate; locating the slotted sleeve along the mast where desired, tightening adjustment screws in the circumferential clamps so as to clamp the slotted tube to the mast where desired; and inserting attachment ears of an attachment link into openings in attachment tabs in the tabbed bearing plate.

The additional features and advantages of the disclosed invention are set forth in the detailed description which follows, and will be apparent to those skilled in the art from the description or recognized by practicing the invention as described, together with the claims and appended drawings.

BRIEF DESCRIPTIONS OF THE DRAWINGS

The present invention addresses the task of safely stowing a flexible mechanical device on a support surface by: (i) removably clamping, to the flexible mechanical device, an anchor point mechanism, and (ii) removably attaching the anchor point mechanism to an engagement feature on the support surface. A user can attach a chain, clip, or hook between the engagement feature and the anchor point mechanism to realize a secure and safe method of anchoring and storing the flexible mechanical device when not in use. The foregoing aspects, uses, and advantages of the present invention will be more fully appreciated as the same becomes better understood from the following detailed description of the present invention when viewed in conjunction with the accompanying figures, in which:

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention. An anchor point apparatus is disclosed, suitable for use in quickly and rigidly attaching and releasing an upper portion of a mast-like pole to a support structure.

Certain terminology may be used in the following description for convenience and reference only, and will not be limiting. For example, the phrases "connected to," "secured to," or similar language include the definitions "indirectly connected to," "directly connected to," "indirectly secured to," and "directly secured to."

Figure 1:
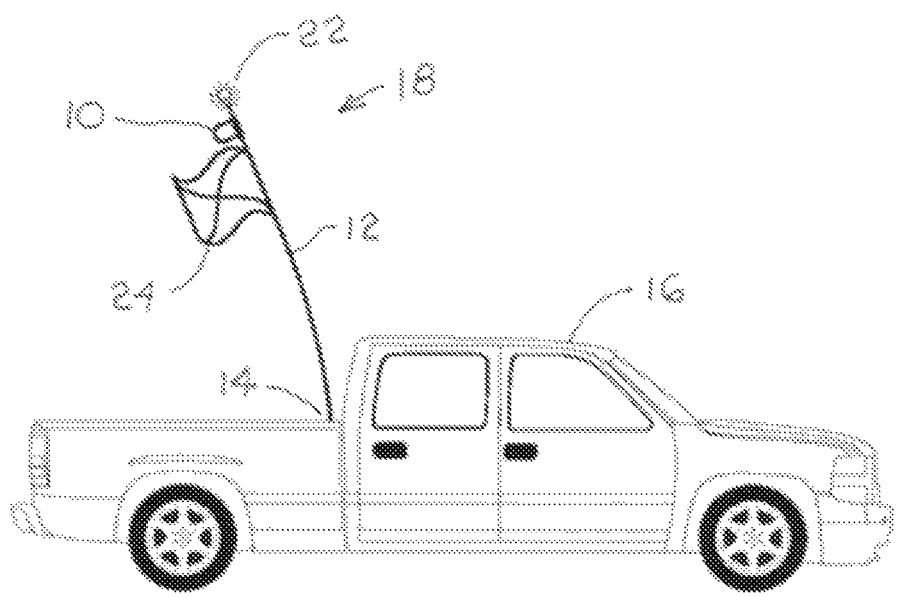
FIG. 1 is a diagrammatical illustration of a flexible mast-like pole mounted at one end to a structure, the mast-like pole having an attached anchor point apparatus in accordance with the present invention.

A typical deployment for an anchor point apparatus 10 is shown in the diagrammatical illustration of FIG. 1. The anchor point apparatus 10 may be removably attached to an upper portion of a mast 12, such as an antenna or a substantially flexible rod, as described in greater detail below. In the example provided, a base end 14 of the mast 12 is secured to a vehicle 16. A free end 18 of the mast 12 may or may not support an emergency light 22 and/or a banner 24, for example.

Figure 2:
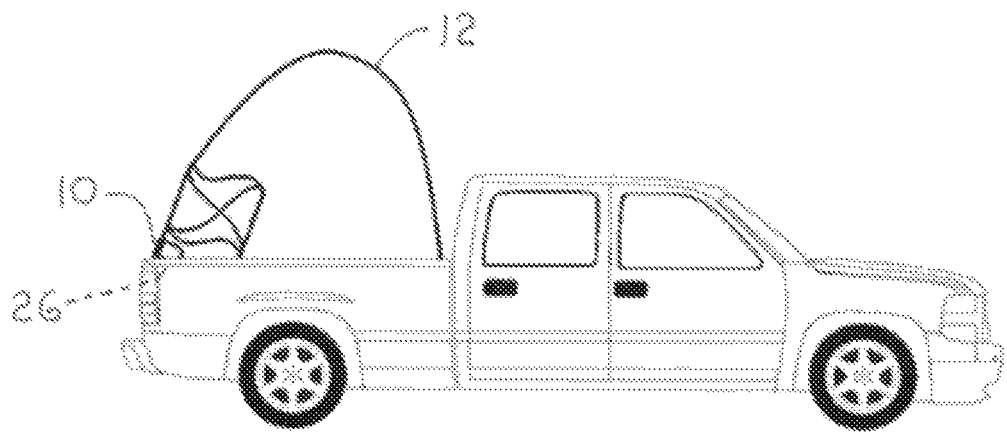
FIG. 2 is a diagrammatical illustration of the mast-like pole of FIG. 1 showing the anchor point apparatus attached to a surface of the structure.

As shown in FIG. 2, the free end 18 of the mast 12 may be stowed by releasably attaching the anchor point apparatus 10 to a surface of the vehicle 16 via an engagement feature 26 (not shown). This may be done, for example, to protect the mast 12 should a "low clearance" situation occur, or may be done to move the emergency light 22 out of sight when not in use.

Figure 3:
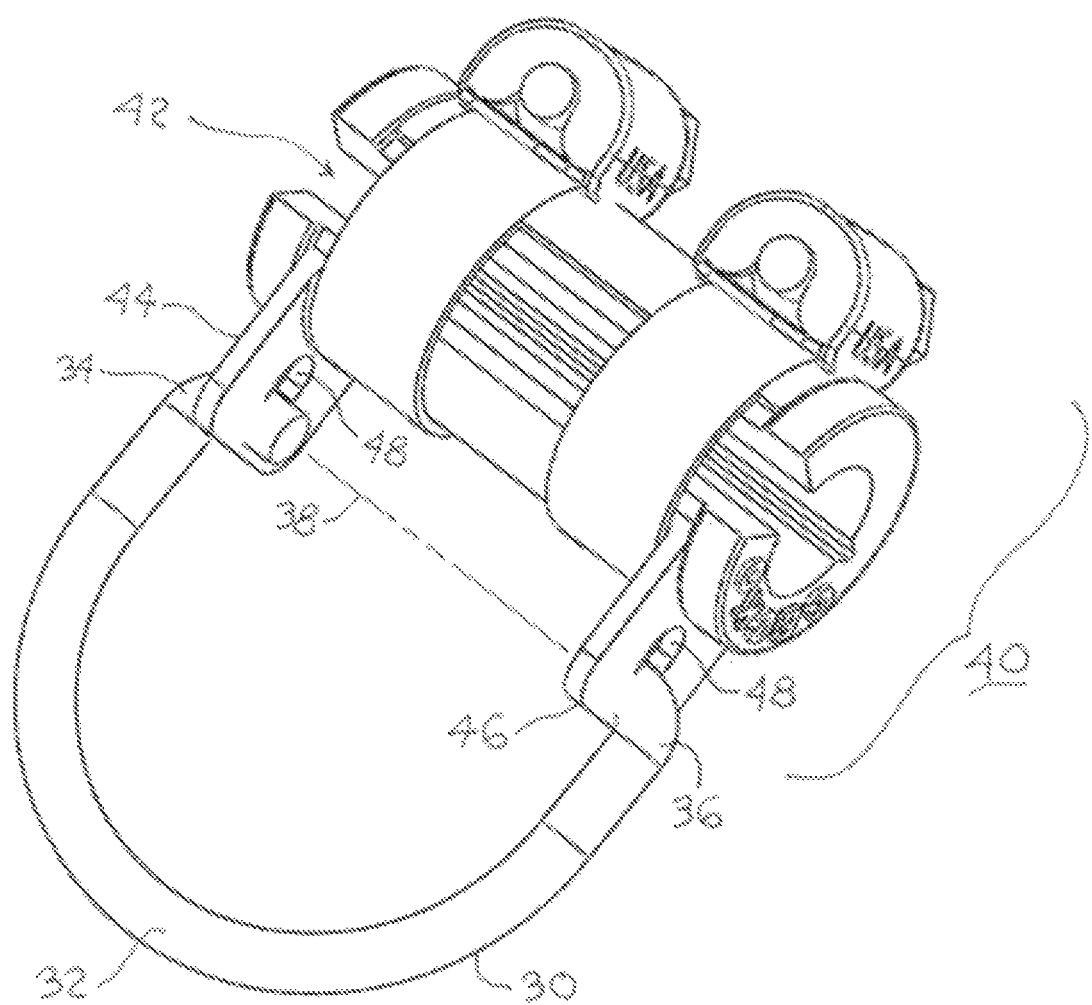
FIG. 3 is a diagrammatical isometric view of the anchor point apparatus of FIG. 1, showing a D-ring secured to a set of mounting tabs.

As shown in FIG. 3, the anchor point apparatus 10 comprises a clamping assembly 40 and an attachment link 30. The attachment link 30 is configured to mechanically link to or couple with the engagement feature 26 on the surface of the vehicle 26. In the embodiment shown, the attachment link 30 is configured as a substantially "D-shaped" ring with a substantially semi-circularly shaped bearing member 32. The bearing member 32 may have a first end forming a substantially right-angled first attachment ear 34, and a second end forming a substantially right-angled second attachment ear 36.

The attachment link 30 may have a substantially circular cross section along its length, that is, the attachment link 30 may be formed from a heavy-gauge plastic or metal rod. The diameter of the plastic or metal rod is preferably large enough such that the attachment link 30 will generally retain its semi-circular shape without bending under load, when releasably attached to the engagement feature 26. In an exemplary embodiment, the engagement feature 26 may comprise a substantially "hook" shape (not shown) configured to extend into the open region in the attachment link 30 and mechanically engage the bearing member 32, as is well known in the relevant art. Alternatively, the user may provide a chain or a clip for attachment to the bearing member 32 by which the attachment link 30 may be secured to the engagement feature 26. The chain, the clip, or the engagement feature 26 may further comprise a locking feature (not shown) to prevent the chain, the clip, or the engagement feature 26 from inadvertently falling away from the attachment link 30 when the vehicle 16 is in motion or when the mast 12 is placed into motion, such as by a strong wind.

In the embodiment shown, the first attachment ear 34 and the second attachment ear 36 may define a common central axis 38, with the end surface of the first attachment ear 34 "facing" the end surface of the second attachment ear 36. That is, the first attachment ear 34 and the second attachment ear 36 may both be "turned inward" in the attachment link 30 to form a substantially "D-shape." In an alternative embodiment (not shown), the end surface of the first attachment ear 34 and the end surface of the second attachment ear 36 may both "face outward" such that the attachment link 30 forms a substantially "omega shape" (Ω-shape).

The clamping assembly 40 includes a central, cylindrical cavity 42, or through-hole, extending along a longitudinal axis of the clamping assembly 40 and configured so as to allow the anchor point apparatus 10 to slide along the outside surface of the mast 12. In an exemplary embodiment, the inside diameter of the cylindrical cavity 42 may be larger than the outside diameter of the mast 12 to allow for sliding. As shown in the illustration, the first attachment ear 34 of the attachment link 30 may be retained in an opening 48 in a first attachment tab 44 of the clamping assembly 40, and the second attachment ear 36 may be retained in the opening 48 in a second attachment tab 46 of the clamping assembly 40. It can be appreciated that the openings 48 may be circular or slotted (as shown), for example, and that the smaller dimensions of slotted openings 48 are larger than the cross sectional diameter of the attachment link 30. This configuration provides dimensional clearances in the anchor point apparatus 10 such that the attachment link 30 is free to "swing" about the central axis 38, while still being retained in the first attachment tab 44 and the second attachment tab 46.

Figure 4:
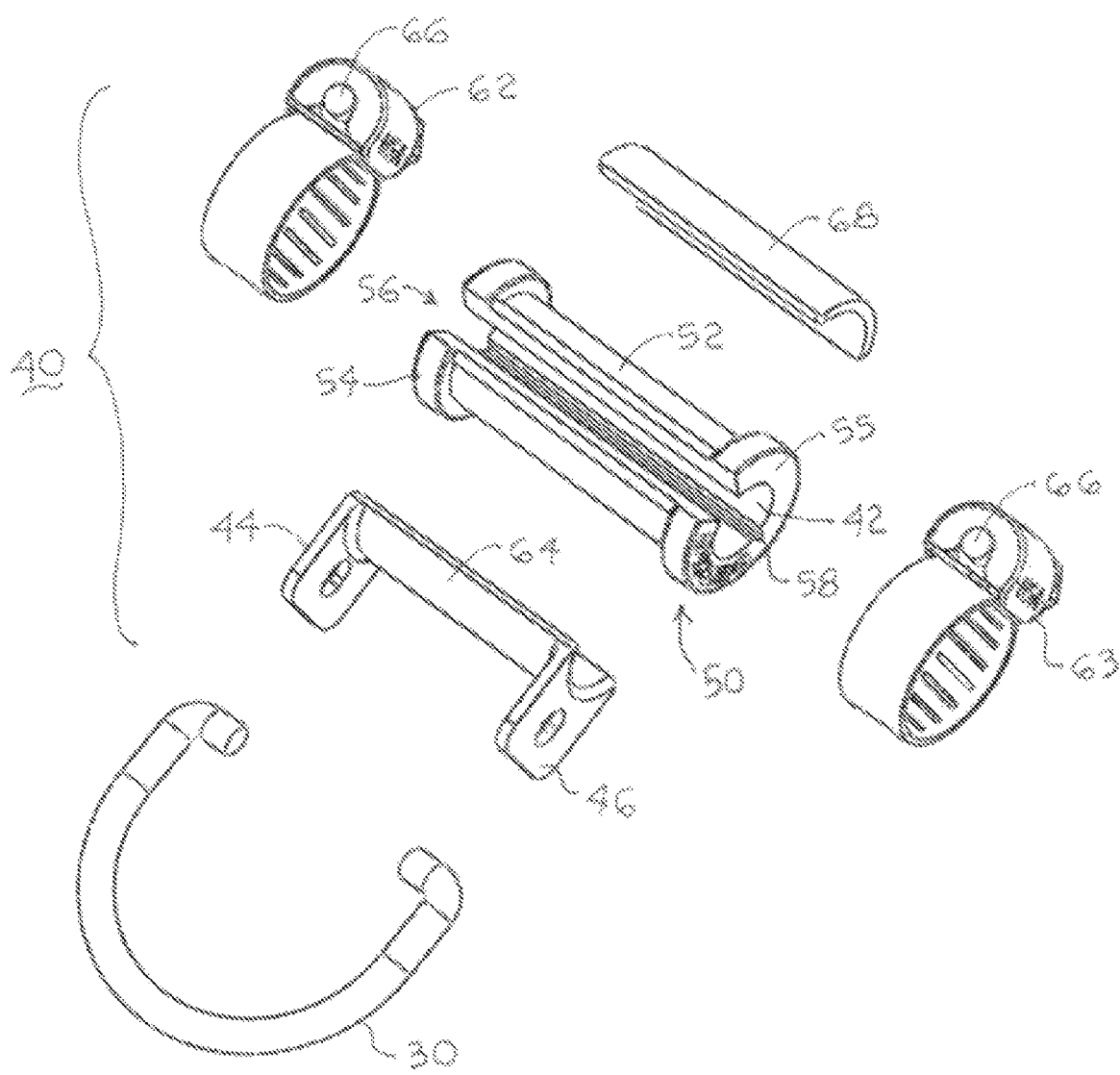
FIG. 4 is an exploded diagrammatical isometric view of the anchor point apparatus coupling device of FIG. 3.

There is shown in FIG. 4 an exploded view of the clamping assembly 40 with the attachment link 30. The clamping assembly 40 includes a slotted sleeve 50, here configured as a slotted tube 52 with a flange 54 at one end of the slotted tube 52 and a flange 55 at the other end of the slotted tube 52. The slotted sleeve 50 includes a longitudinal slot 56 dimensionally configured so as to allow the mast 12, or other cylindrical or rod-like component, to be laterally placed into and taken out of the slotted tube 50 without the need for sliding the slotted sleeve 50 along the length of the mast 12, or other cylindrical or rod-like component.

There may additionally be provided a longitudinal groove 58 formed in the interior cylindrical surface of the slotted sleeve 50. It should be noted that central, cylindrical cavity 42, or through-hole, extends along a longitudinal axis of the slotted tube 52. The longitudinal groove 58 may function to allow a user to temporarily widen the slot 56 and to thus make it easier to place the anchor point apparatus 10 onto the mast 12, or other cylindrical or rod-like component.

The slotted sleeve 50 may function as an elastic concave surface configured to frictionally retain the mast 12 when radially "squeezed" by means of a first circumferential clamp 62 and a second circumferential clamp 63. In an exemplary embodiment, the clamps 62, 63 may comprise commercially-available hose clamps. The slotted sleeve 50 may be fabricated from a plastic material, wood, fiberglass, metal, or a composite material, as may be determined by a designer of the clamping assembly 40. As shown in the illustration, the first attachment tab 44 and the second attachment tab 46 are disposed at the respective ends of a convex-surface tabbed bearing plate 64 configured to engage and fit over (i.e., conform to) a portion of the outer surface of the slotted tube 52.

The first attachment tab 44 and the second attachment tab 46 may extend from the slotted tube 52 at substantially right angles, or at any other angle suitable for providing a means for retaining the attachment link 30. In an exemplary embodiment, the tabbed bearing plate 64 may be placed over the slotted rube 52, and the first circumferential clamp 62 and the second circumferential clamp 63 may be placed over the tabbed bearing plate 64. Preferably, the inner concave surface of the tabbed bearing plate 64 may substantially conform to the outer convex surface of the slotted sleeve 50.

An adjustment screw 66 may be provided in each of the first circumferential clamp 62 and in the second circumferential clamp 63 so as to control the amount of compressive force exerted on the slotted sleeve 50, and may thus selectively vary the diameter of the cylindrical cavity 42. This action results in a controllable circumferential clamping force applied to the outer surface of the mast 12, which force serves to frictionally retain the clamping assembly 40 in a desired location on the mast 12. It should be understood that, although the cylindrical cavity 42 is shown as having a substantially circular cross section, other cross-sectional shapes can also be used in the slotted sleeve 50, such as a triangular cross section, a square cross section, or a hexagonal cross section, for example, depending on the preference of the designer of the anchor point apparatus 10.

As can be appreciated by one skilled in the art, the tabbed bearing plate 64 serves to distribute the compressive force applied to the slotted sleeve 50 by the first circumferential clamp 62 and by the second circumferential clamp 63. In an exemplary embodiment, the clamping assembly 40 may include a convex bearing plate 68, generally conforming to a portion of the outer surface of the slotted sleeve 50, to as to further distribute the compressive force over the outer surface of slotted sleeve 50.

Preferably, the tabbed bearing plate 64 and the convex bearing plate 68 are fabricated from a high-strength material, such as metal or plastic, so as to not break under the compressive forces provided by the first circumferential clamp 62 and by the second circumferential clamp 63. In this manner, the tabbed bearing plate 64 and the convex bearing plate 68 (when used) further function to prevent damage to the outer surface of the slotted sleeve 50 by the actions of the first circumferential clamp 62 and the second circumferential clamp 63. In an alternative embodiment, either or both of the tabbed bearing plate 64 and the convex bearing plate 68 may be molded into or chemically adhered to the slotted sleeve 50.

It can be appreciated by one skilled in the art that the flanges 55, 56 are provided to prevent the tabbed bearing plate 64 and the convex bearing plate 68 from shifting on the slotted sleeve 50. In an alternative embodiment, either or both the flanges 55, 56 may be optional features, and one or both the flanges 55, 56 may be left off the slotted tube 52.

In an exemplary embodiment, a user may removably clamp the anchor point apparatus 10 to the mast 12 by executing the steps of: (1) placing or sliding the slotted sleeve 50 onto the mast 12, (2) positioning the tabbed bearing plate 64 against a first part of the slotted sleeve 50, (3) optionally positioning the convex bearing plate 68 against another part of the slotted sleeve 50, (4) positioning the circumferential clamps 62, 63 so as to enclose the tabbed bearing plate 64, (5) locating the slotted sleeve 50 along the mast 12 where desired, (6) tightening the adjustment screws 66 so as to positively clamp the slotted tube 52 to the mast 12 at the location desired, and (7) Inserting the attachment ears 34, 36 of the attachment link 30 into the openings 48 ire the attachment tabs 44, 46. Alternatively, the anchor point apparatus 10 may be provided in an assembled state, such that the user can slide the anchor point apparatus 10 over the mast 12 to the location desired, and then be clamped in place by tightening the adjustment screws 66.

It is to be understood that the description herein is exemplary of the invention only and is intended to provide an overview for the understanding of the nature and character of the disclosed illumination systems. The accompanying drawings are included to provide a further understanding of various features and embodiments of the method and devices of the invention which, together with their description serve to explain the principles and operation of the invention.

Furthermore, what has been described and illustrated herein are exemplary embodiments of the invention. The terms, descriptions and figures used herein are set forth by way of illustration only and are not meant as limitations. Those skilled in the art will recognize that many variations are possible within the spirit and scope of the invention in which all terms are meant in their broadest, reasonable sense unless otherwise indicated.

Other objects and advantages of the present invention will become obvious to the reader and it is intended that these objects and advantages are within the scope of the present invention. To the accomplishment of the above and related objects, this invention may be embodied in the form illustrated in the accompanying drawings, attention being called to the fact, however, that the drawings are illustrative only, and that changes may be made in the specific construction illustrated and described within the scope of this application.

What is claimed is:

1. An anchor point apparatus suitable for removably clamping to a mast, said anchor point apparatus comprising:
   a slotted tube having a substantially cylindrical cavity extending along a longitudinal axis of said slotted tube;
   a tabbed bearing plate including a first attachment tab and a second attachment tab, said attachment tabs extending at predetermined angles from said tabbed bearing plate, said tabbed bearing plate generally conforming to a portion of an outer surface of said slotted tube;
   at least one circumferential clamp disposed about said slotted tube; and
   an attachment link having a first attachment ear secured within a first opening in said first attachment tab and a second attachment ear secured within a second opening in said second attachment tab.

2. The anchor point apparatus of claim 1 wherein said cylindrical cavity comprises a diameter larger than a diameter of the mast.

3. The anchor point apparatus of claim 1 wherein said slotted tube further comprises a flange.

4. The anchor point apparatus of claim 1 wherein said slotted tube further comprises a longitudinal groove disposed in said cylindrical cavity.

5. The anchor point apparatus of claim 1 wherein said first attachment ear has an end facing an end on said second attachment ear such that said attachment link is configured in a substantially D-shape.

6. The anchor point apparatus of claim 1 wherein said slotted tube comprises a flexible material.

7. An anchor point apparatus comprising:
   a slotted sleeve including a slotted tube, said slotted tube having a substantially cylindrical cavity extending along a longitudinal axis of said slotted tube, said slotted sleeve further including a first flange at a first end of said slotted tube and a second flange at a second end of said slotted tube;
   a tabbed bearing plate including a first attachment tab and a second attachment tab, said first attachment tab and said second attachment tab extending at substantially right angles from said tabbed bearing plate, said tabbed bearing plate having a curved surface generally conforming to an outer surface of said slotted tube;
   a convex bearing plate disposed against said slotted tube;
   a first circumferential clamp disposed about said slotted tube proximate said first flange and a second circumferential clamp disposed about said slotted tube proximate said second flange; and
   an attachment link having a substantially semi-circularly shaped bearing member.

8. The anchor point apparatus of claim 7 wherein said slotted sleeve comprises at least one of a metal, a plastic, or a composite material.

9. The anchor point apparatus of claim 7 wherein said attachment link further comprises a first attachment ear disposed in said first attachment tab and a second attachment ear disposed in said second attachment tab.

10. The anchor point apparatus of claim 7 wherein said attachment link comprises at least one of a heavy-gauge plastic rod or a heavy-gauge metal rod.

11. The anchor point apparatus of claim 7 wherein said tabbed bearing plate comprises at least one of a metal and a plastic material.

* * * * *